US012790486B2

(12) United States Patent
Morira et al.

(10) Patent No.: US 12,790,486 B2
(45) Date of Patent: Nov. 10, 2026

(54) POLYURETHANE ELASTIC FIBER

(71) Applicant: TORAY LYCRA CO., LTD, Osaka (JP)

(72) Inventors: Kazutake Morira, Shiga (JP); Toshihiro Tanaka, Shiga (JP)

(73) Assignee: TORAY LYCRA CO., LTD., Osaka (JP)

( * ) Notice: Subject to any disclaimer, the term of this patent is extended or adjusted under 35 U.S.C. 154(b) by 599 days.

(21) Appl. No.: 18/247,221

(22) PCT Filed: Sep. 29, 2021

(86) PCT No.: PCT/IB2021/058925
§ 371 (c)(1),
(2) Date: Mar. 29, 2023

(87) PCT Pub. No.: WO2022/070083
PCT Pub. Date: Apr. 7, 2022

(65) Prior Publication Data

US 2023/0383123 A1 Nov. 30, 2023

(30) Foreign Application Priority Data

Sep. 29, 2020 (JP) ................................ 2020-163039

(51) Int. Cl.
*C08L 75/08* (2006.01)
*C08G 18/28* (2006.01)
(Continued)

(52) U.S. Cl.
CPC ............ *C08L 75/08* (2013.01); *C08G 18/282* (2013.01); *C08G 18/3206* (2013.01);
(Continued)

(58) Field of Classification Search
CPC ................ C08L 75/08; C08L 2203/12; C08L 2205/025; C08G 18/4854; C08G 18/7671; C08G 18/282
See application file for complete search history.

(56) References Cited

FOREIGN PATENT DOCUMENTS

| | | | |
|---|---|---|---|
| CN | 106592016 A * | 4/2017 | .......... C08G 18/664 |
| JP | 2010150720 A * | 7/2010 | |
| JP | 4974086 B2 * | 7/2012 | |

OTHER PUBLICATIONS

CN106592016A Espacenet Translation (Year: 2017).*
JP2010150720A Espacenet Translation (Year: 2010).*
JP4974086B2 Espacenet Translation (Year: 2012).*

* cited by examiner

*Primary Examiner* — Randy P Gulakowski
*Assistant Examiner* — Virginia L Stonehocker
(74) *Attorney, Agent, or Firm* — Hoffmann & Baron, LLP

(57) ABSTRACT

Problem To provide a polyurethane elastic yarn having good heat setting properties in a wide temperature range and high thermal adhesive strength in a wide temperature range while also maintaining its elastic properties (permanent deformation and elongation). Solution A polyurethane elastic yarn comprising polyurethane polymer [A] and polyurethane polymer [B] below, wherein the ratio of polyurethane polymer [A] to polyurethane polymer [B] in terms of parts by mass is from 1:99 to 30:70 or from 70:30 to 99:1, the exothermic peak (crystallization peak) of the polyurethane elastic yarn as measured by a differential scanning calorimeter (DSC) is in the range from 110° C. to 210° C., and the heat capacity at the exothermic peak is 3.0 J/g or more and 100 J/g or less. Polyurethane polymer [A]: a polyurethane polymer using as starting materials polymer diol A whose main chain repeating unit is an ether or an ester, diisocyanate A whose main skeleton is aromatic or aliphatic, and a single (Continued)

low molecular weight diol A having from 2 to 4 carbon atoms CA serving as a chain extender. Polyurethane polymer [B]: a polyurethane polymer using as starting materials polymer diol A, diisocyanate A, and a single low molecular weight diol B having from 1 to 4 carbon atoms CB more than CA serving as a chain extender.

5 Claims, 1 Drawing Sheet

(51) Int. Cl.
*C08G 18/32* (2006.01)
*C08G 18/48* (2006.01)
*C08G 18/76* (2006.01)
(52) U.S. Cl.
CPC ..... *C08G 18/4854* (2013.01); *C08G 18/7671* (2013.01); *C08L 2203/12* (2013.01); *C08L 2205/025* (2013.01)

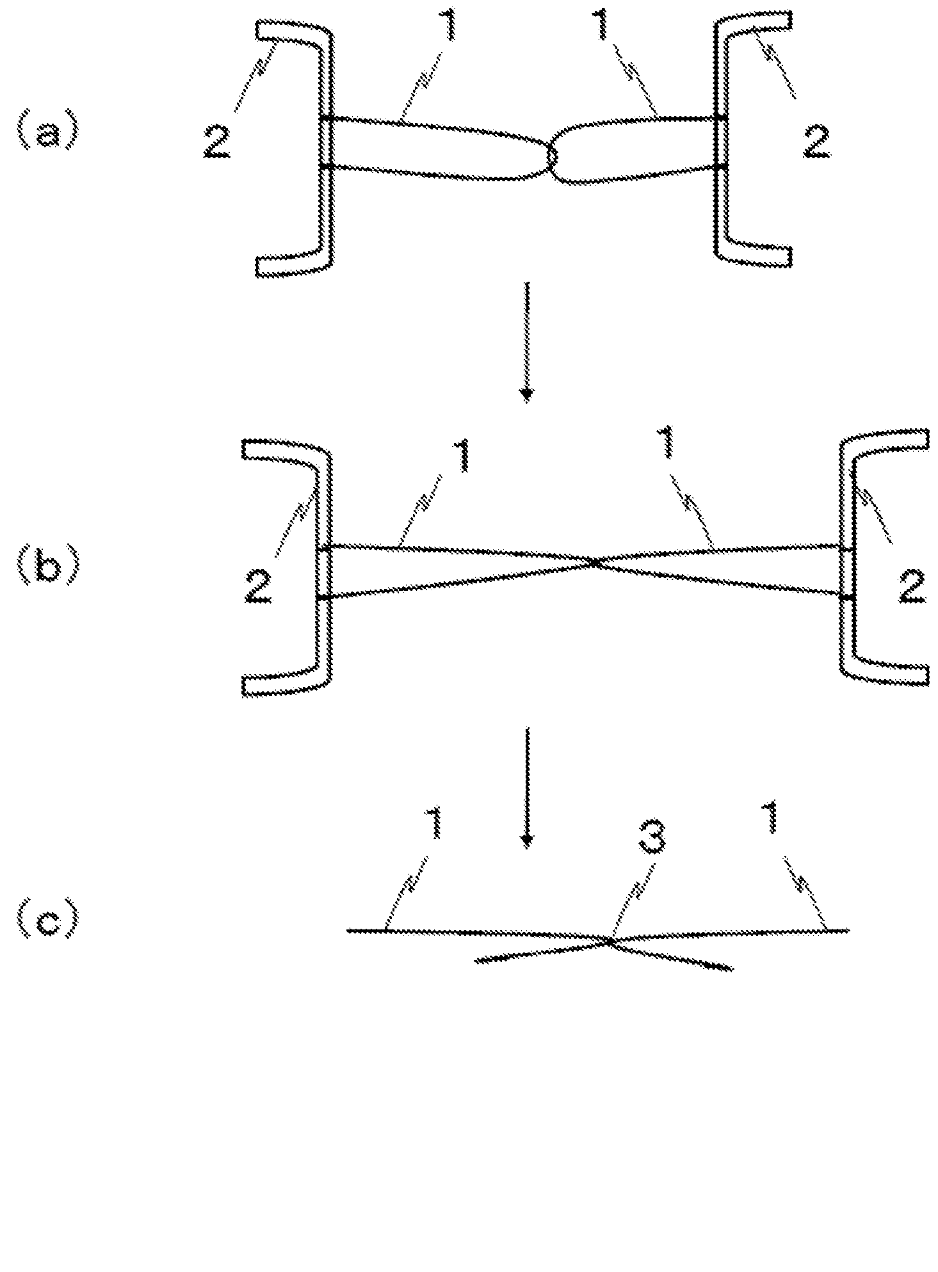
(a)
1
1
2
2
(b)
1
1
2
2
(c)
1
3
1

POLYURETHANE ELASTIC FIBER

TECHNICAL FIELD

The present invention relates to a polyurethane elastic yarn. More specifically, the present invention relates to a polyurethane elastic yarn having good heat setting properties in a wide temperature range and high thermal adhesive strength in a wide temperature range while also maintaining its elastic properties (permanent deformation and elongation).

BACKGROUND ART

Because of their superior elastic properties, elastic yarns are used in a wide range of applications, including elastic clothing applications such as legwear, innerwear and sportswear, sanitary applications such as disposable diapers and sanitary napkins (as a protective material), and industrial applications. These elastic yarns require high heat setting properties, especially polyurethane elastic yarns. For example, when producing a stretchable fabric containing a polyurethane elastic yarn, high heat setting properties are required in order to obtain the desired fabric dimensions and to adjust the shape and appearance of the end portion of the fabric. Also, by using a polyurethane elastic yarn with high heat setting properties, the processing temperature can be lowered and a textile product with an excellent texture can be obtained. Lowering the processing temperature also has the advantage of lowering energy consumption and reducing utility costs.

When elastic fibers are used in clothing, they are usually cross-woven and the resulting fabric is cut, sewn, and finished to obtain a product. Fabrics that are cross-woven using polyurethane elastic yarn tend to fray at the edges when cut and sewn. When polyurethane elastic yarn is pulled out from the knitted fabric along a frayed edge portion, the elasticity properties deteriorate in that portion of the fabric.

In a typical product, some sort of edging is performed to keep the cut edges from fraying. For example, a cut edge is often folded over and a double layer is sewn together, or the edge is wrapped with another type of cloth such as tape and sewn together. However, anti-fray processing such as trimming and sewing takes time to perform in the production process for clothing products, and is a significant economic burden on producers. Clothing products that have been trimmed or sewn at the edges have thicker fabric along the edges, which creates unevenness. In the case of undergarments such as foundation garments, unevenness occurs when outerwear is worn over them, which spoils the appearance. Many clothing products using polyurethane elastic yarn are tight fitting, such as foundation garments and pantyhose, and the thicker edges feel less comfortable.

In order to solve the problem of having to sew the edges of clothing using polyurethane elastic yarn in the field of foundation garments such as brassieres, girdles and body suits, which have become more fashionable in recent years, production methods for garments have been studied which use so-called free-cut openings without any cut or sewn edges in which undergarment lines do not appear under outerwear.

For example, clothing using fabrics that do not need to be cleaned up has been proposed. This clothing uses a warp-knitted fabric that does not require clean up, in which the knitting structure is a 1×1 knitting structure with inelastic yarn and elastic yarn, and at least the inelastic yarn or the elastic yarn is knitted with a closed stitch by each knitting needle (see Patent Document 1). While the design of the fabric makes it difficult for the cut edges to fray structurally, a thicker fabric is obtained. This places restrictions on fabrics that can be obtained by fabric design, and clothing applications are limited.

A garment with a free-cut opening has also been proposed in which a low melting point polyurethane elastic yarn is used as a heat-sealing elastic yarn, and the other yarn is knitted by plating knitting and heat-set to obtain a knitted fabric with an anti-fray function (see Patent Document 2).

However, the low melting point polyurethane elastic yarn causes a decline in fabric recoverability when treated under high temperature conditions because of a significant deterioration in physical properties due to the heat in the setting process used to fix the fabric or product or the heat in the dyeing process. When subjected to more severe thermal processing conditions, breakage of the polyurethane elastic yarn occurs. Therefore, products using this fabric have heat restrictions on the processing conditions.

A polyurethane elastic yarn containing thermoplastic polyurethane has also been proposed as a heat-sealing elastic yarn, but adhesive performance has not reached a satisfactory level (see Patent Document 3).

PRIOR ART DOCUMENTS

Patent Documents

[Patent Document 1] JP 2003-147618 A
[Patent Document 2] JP 2005-113349 A
[Patent Document 3] JP 2010-150676 A

SUMMARY OF THE INVENTION

Problem to be Solved by the Invention

It is an object of the present invention to provide a polyurethane elastic yarn having good heat setting properties in a wide temperature range and high thermal adhesive strength in a wide temperature range while also maintaining its elastic properties (permanent deformation and elongation), and a method for producing this polyurethane elastic yarn.

Means for Solving the Problem

The present invention solves this problem by adopting the following means.

(1) A polyurethane elastic yarn comprising polyurethane polymer [A] and polyurethane polymer [B] below, wherein
- the ratio of polyurethane polymer [A] to polyurethane polymer [B] in terms of parts by mass is from 1:99 to 30:70 or from 70:30 to 99:1,
- the exothermic peak (crystallization peak) of the polyurethane elastic yarn as measured by a differential scanning calorimeter (DSC) is in the range from 110° C. to 210° C., and
- the heat capacity at the exothermic peak is 3.0 J/g or more and 100 J/g or less.

Polyurethane Polymer [A]:
- a polyurethane polymer using as starting materials
- polymer diol A whose main chain repeating unit is an ether or an ester,
- diisocyanate A whose main skeleton is aromatic or aliphatic, and a single low molecular weight diol A having from 2 to 4 carbon atoms CA serving as a chain extender Polyurethane Polymer [B]:

a polyurethane polymer using as starting materials polymer diol A, diisocyanate A, and a single low molecular weight diol B having from 1 to 4 carbon atoms CB more than CA serving as a chain extender (2) A polyurethane elastic yarn according to claim 1, wherein the melting point MpA of polyurethane polymer [A] as measured by a differential scanning calorimeter (DSC) is from 130 to 260° C., and the melting point MpB of polyurethane polymer [B] as measured by a differential scanning calorimeter (DSC) is 10 to 100° C. lower than melting point MpA.

(3) A polyurethane elastic yarn according to claim 1 or 2, wherein polyurethane polymer [A] is a polyurethane polymer polymerized in solution.

(4) A polyurethane elastic yarn according to any one of claims 1 to 3, wherein the polymer diol in polyurethane polymer [A] is poly (tetramethylene ether) glycol (PTMG).

(5) A method for producing a polyurethane elastic yarn comprising polymerizing each of polyurethane polymer [A] and polyurethane polymer [B] below separately in solution, mixing together both polymerization solutions, and spinning the prepared spinning stock solution.

Polyurethane Polymer [A]:

a polyurethane polymer using as starting materials polymer diol A whose main chain repeating unit is an ether or an ester, diisocyanate A whose main skeleton is aromatic or aliphatic, and a single low molecular weight diol A having from 2 to 4 carbon atoms CA serving as a chain extender Polyurethane Polymer [B]:

a polyurethane polymer using as starting materials polymer diol A, diisocyanate A, and a single low molecular weight diol B having from 1 to 4 carbon atoms CB more than CA serving as a chain extender

Effect of the Invention

The present invention is able to provide a polyurethane elastic yarn having good heat setting properties in a wide temperature range and high thermal adhesive strength in a wide temperature range while also maintaining its elastic properties (permanent deformation and elongation), and a method for producing this polyurethane elastic yarn.

MODE FOR CARRYING OUT THE INVENTION

The present invention will now be described in greater detail.

In the present invention, polyurethane polymer [A] and polyurethane polymer [B] described below are included at a specific ratio and have specific heat generating properties. An unprecedented polyurethane elastic yarn with excellent heat setting properties over a wide temperature range and excellent thermal adhesive strength over a wide temperature range never been seen before, and a method for producing this polyurethane elastic yarn, can be provided by controlling the chain extender in each of polyurethane polymer [A] and polyurethane polymer [B].

[Polyurethane Polymer [A]]

Polyurethane polymer [A] used in the polyurethane elastic yarn of the present invention will now be described.

Polyurethane polymer [A] used in the present invention is a polyurethane polymer using as starting materials polymer diol A whose main chain repeating unit is an ether or an ester, diisocyanate A whose main skeleton is aromatic or aliphatic, and a single low molecular weight diol A having from 2 to 4 carbon atoms CA serving as a chain extender.

The polymer diol, diisocyanate, and low molecular weight diol chain extender that are used as starting materials are such that the resulting polyurethane polymer has a certain structure derived from each of these components. In other words, the structure of the polyurethane polymer obtained using a polymer diol, diisocyanate, and low molecular weight diol chain extender as raw materials is specified, not the raw materials themselves. Similarly, there are no particular restrictions on the synthesis method used as long as synthesis is performed using these same raw materials.

When explaining the specific structure of the polyurethane polymers ([A] and [B]) used in the present invention below, the explanation of the synthesis process using a polymer diol and a diisocyanate as raw materials is provided as an example, and is provided only to more conveniently specify the partial structure of the polyurethane polymers. There are no particular restrictions on the raw materials or production methods.

[Polymer Diol A]

Polymer diol A preferably has a polyether-based skeleton in which the repeating unit of the main chain is an ether or a polyester-based skeleton in which the repeating unit of the main chain is an ester. From the standpoint of imparting flexibility and elongation to the polyurethane elastic yarn, a polyurethane polymer with a repeating unit in the main chain that can introduce a polyether-based partial structure to a polyurethane polymer is especially preferred.

Preferred examples of polymer diol that impart a polyether-based partial structure to a polyurethane polymer include polyethylene oxide, polyethylene glycol, derivatives of polyethylene glycol, polypropylene glycol, polytetramethylene ether glycol (PTMG), modified PTMG (3M-PTMG below) that is a copolymer of tetrahydrofuran (THF) and 3-methyltetrahydrofuran, modified PTMG that is a copolymer of THF and 2,3-dimethyl THF, the polyols with side chains on both sides disclosed in JP 2615131 B2, etc., and random copolymers with irregularly arranged THF and ethylene oxide and/or propylene oxide. One or more types of structures derived from these examples may be incorporated into a main chain as repeating units.

From the standpoint of imparting wear resistance and light resistance to a polyurethane elastic yarn, preferred examples of polymer diols that can introduce a polyether-based partial structure to a polyurethane polymer include butylene adipate, polycaprolactone diol, polyester-based diols such as the polyester polyols with side chains disclosed in JP S61-026612 A, etc., and the polycarbonate diols disclosed in JP H02-289516 A, etc.

Among these polymer diols A, polytetramethylene ether glycol is preferred because of its good elastic properties (permanent deformation and elongation) and its good stretchability (permanent deformation and elongation) and its economic advantages.

One of these polymer diols or two or more of these polymer diols may be used.

The molecular weight of the polymer diol is preferably 1,000 or more and 8,000 or less, and more preferably 1,500 or more and 6,000 or less, from the standpoint of imparting elongation, strength, and heat resistance when the yarn is made. When the molecular weight of the polymer diol is in this range, an elastic yarn with excellent elongation, strength, elastic resilience, and heat resistance can be obtained. The molecular weight of the partial structure can be adjusted by selecting a polymer diol A with the appropriate number average molecular weight as a raw material.

[Diisocyanate A]

A diisocyanate A with an aromatic or aliphatic main skeleton is preferred. Here, aliphatic skeleton means a chain-like aliphatic skeleton and/or a chain-like alicyclic skeleton.

A diisocyanate A with an aromatic main structure, such as diphenylmethane diisocyanate (MDI), tolylene diisocyanate, 1,4-diisocyanate benzene, xylylene diisocyanate or 2,6-naphthalene diisocyanate, is especially suitable for producing a polyurethane polymer that imparts high heat resistance and strength to a polyurethane elastic yarn.

A diisocyanate with an aliphatic main skeleton is especially effective at suppressing the yellowing of polyurethane elastic yarn. Among diisocyanates with an aliphatic main skeleton, diisocyanates with an alicyclic main skeleton are also preferred, such as methylenebis (cyclohexyl isocyanate) (H12MDI below), isophorone diisocyanate, methylcyclohexane 2,4-diisocyanate, methylcyclohexane 2,6-diisocyanate, cyclohexane 1,4-diisocyanate, hexahydroxylylene diisocyanate, hexahydrotolylene diisocyanate, and octahydro-1,5-naphthalene diisocyanate.

One of these diisocyanates or two or more of these diisocyanates may be used.

[Chain Extender]

A chain extender is a compound with at least two active hydrogen groups, and is used to efficiently increase the molecular weight of a polyurethane polymer composed of a polymer diol and a diisocyanate in the polymerization step for the polyurethane polymer. A chain extender having a relatively low molecular weight is preferred from the standpoint of increasing the reactivity, and crystallinity and rigidity of the hard segment. Specifically, it is a low molecular weight diol such as ethylene glycol, 1,3-propanediol, 1,4-butanediol, 1,5-pentanediol, 1,6-hexanediol, 2-methyl-1,5-pentanediol, 1,7-heptanediol, 1,8-octanediol, and 1-methyl-1,2-ethanediol.

The chain extender for polyurethane polymer [A] in the present invention is a single low molecular weight diol A having from 2 to 4 carbon atoms CA. The chain extender is a low molecular weight diol A, and can be any one of ethylene glycol, 1,3-propanediol, and 1,4-butanediol. A low molecular weight diol A is used because when combined in specific amounts with the polyurethane polymer [B] using a low molecular weight diol B described below, a polyurethane elastic yarn can be obtained with an exothermic peak (crystallization peak) as measured by a differential scanning calorimeter (DSC) in the range from 110° C. to 210° C., and a heat capacity at the exothermic peak of 3.0 J/g or more.

[Polyurethane Polymer [B]]

Polyurethane polymer [B] in the present invention will now be described. As explained in detail below, by including a polyurethane polymer [B] with a specific structure in a specific range, the crystallization of the hard segment of polyurethane polymer [A] can be kept from continuing while the polyurethane elastic yarn is being spun, and this is believed to result in the effects of the present invention. From the standpoint of compatibility with the hard segment of polyurethane polymer [A], polyurethane polymer [B] in the present invention uses as starting materials the polymer diol A in polyurethane polymer [A] whose main chain repeating unit is an ether or an ester, diisocyanate A in polyurethane polymer [A] whose main skeleton is aromatic or aliphatic, and a single low molecular weight diol B having from 1 to 4 carbon atoms CB more than CA serving as a chain extender.

Regarding the structure, the reason polyurethane polymer [A] and polyurethane polymer [B] result in the effects of the present invention when used at a ratio of 1:99 to 30:70 or 70:30 to 99:1 in terms of parts by mass is believed to be the following. In the following explanation, the ratio of polyurethane polymer [A] to polyurethane polymer [B] is from 70:30 to 99:1 in terms of parts by mass. When a small amount of polyurethane polymer [B] with this structural relationship is added at the spinning site while the hard segments of polyurethane polymer [A] are aggregating to form a partially crystalline portion, polyurethane polymer [B] easily enters between the hard segments of polyurethane polymer [A] to inhibit the formation of crystals consisting of the aggregated hard segments (hard segment crystals below). A polyurethane elastic yarn in which crystal formation has been inhibited in this way has good thermoplasticity at relatively low temperatures from 110° C. to 210° C., and the heat setting properties and thermal adhesion can improve significantly. In this explanation, the ratio of polyurethane polymer [A] to polyurethane polymer [B] was from 70:30 to 99:1 in terms of parts by mass, but these ratios in reverse are believed to result in the same effects for the same reason. However, a ratio of polyurethane polymer [A] to polyurethane polymer [B] of from 70:30 to 99:1 in terms of parts by mass is preferred. Here, thermal adhesion is the function whereby a polyurethane elastic yarn and/or a polyurethane elastic yarn and another cross-knitted yarn are heat-bonded to each other when a fabric containing the polyurethane elastic yarn is heat-treated. This function is very important for preventing yarn breaking and/or fraying in pantyhose and other free-cut products.

The crystallization point of polyurethane polymer [B] in the present invention is preferably equal to or lower than the boiling point of the solvent in polyurethane polymer [A] used in yarn making. In this situation, the polyurethane polymer [B] does not crystallize during spinning, and the crystallization of the hard segments in polyurethane polymer [A] can be further inhibited. The crystallization point of polyurethane polymer [B] is preferably in the range from 110° C. to 210° C. When the crystallization point is lower than 110° C., spinnability may deteriorate due to the amount added, and the polyurethane elastic yarn may stick together when spooled. When the crystallization point exceeds 210° C., good thermal adhesiveness cannot be obtained unless the heat treatment temperature is raised, which is not preferable. From this standpoint, the crystallization point of polyurethane polymer [B] is more preferably in the range from 110° C. to 160° C. Also, when the heat capacity of the exothermic peak at the crystallization point is 3.0 J/g or more and 100 J/g or less, good thermal adhesion is exhibited. This value is more preferably 8.0 J/g or more and 80 J/g or less. The crystallization point can be measured by preparing a cast film from polyurethane polymer [B] and using this cast film as the sample in a measurement with a differential scanning calorimeter (DSC). A general-purpose DSC can be used, and the scanning speed is preferably from 1° C./min to 10° C./min.

From the standpoint of obtaining good spinnability, well-balanced mechanical properties, thermal adhesion and heat resistance, the amount of polyurethane polymer [B] in a polyurethane elastic yarn of the present invention is preferably in the range of 1.0% by weight or more and 30% by weight or less, or in the range of 99% by weight or less and 70% by weight or more.

In cases where the amount of polyurethane polymer [B] is lower than the amount of polyurethane polymer [A], sufficient thermal adhesion cannot be obtained if the proportion of polyurethane polymer [B] in the polyurethane elastic yarn is less than 1.0% by weight, and spinnability and mechanical properties deteriorate if more than 30% by weight.

In cases where the amount of polyurethane polymer [B] is higher than the amount of polyurethane polymer [A], the amount of polyurethane polymer [B] is preferably in the range of 99% by weight or less and 70% by weight or more. In these cases, where the situation is the reverse of that described above, polyurethane polymer [A] easily enters between the hard segments of polyurethane polymer [B] at the spinning site while the hard segments of polyurethane polymer [B] are aggregating. As described above, polyurethane polymer [A] does not crystallize during spinning, and this functions as the component that inhibits the crystallization of the hard segments of polyurethane polymer [B].

[Melting Point of Polyurethane Polymer]

Polyurethane polymer [A] in the present invention preferably has a melting point MpA as measured by a differential scanning calorimeter (DSC) of 130 to 260° C. In this range, there is good compatibility with the processing temperature and with other fibers, and good thermal adhesiveness is exhibited, which is an object of the present invention. Specifically, polyester fibers with high processing temperatures such as in the dyeing process can be heat-bonded as well as polypropylene fibers with low processing temperatures such as in the heat setting process. The melting point MpB of polyurethane polymer [B] as measured using a differential scanning calorimeter (DSC) is preferably 10° C. to 100° C. lower than melting point MpA. In this range, the good thermal adhesiveness that is an object of the present invention can be exhibited whether the ratio of polyurethane polymer [A] to polyurethane polymer [B] is from 1:99 to 30:70 or from 70:30 to 99:1 in terms of parts by mass.

Note that these amounts should be tested beforehand so that the appropriate amounts can be determined based on the intended use of the yarn.

In the following explanation of the method, the amount of polyurethane polymer [B] in the polyurethane elastic yarn is from 1.0 to 30% by weight. The polyurethane polymer [B] is added to a spinning stock solution before spinning containing polyurethane polymer [A] and N,N-dimethylformamide or N,N-dimethylacetamide, etc. as a solvent. Stirring and mixing may be performed to disperse or dissolve these components more evenly. Alternatively, polyurethane polymer [B] may be uniformly dispersed or dissolved in the solvent before being mixed with a polyurethane polymer [A] solution.

The spinning stock solution containing polyurethane polymer [A] and a solvent is preferably a polyurethane polymer polymerized in solution, that is, one in which polyurethane polymer [A] has been polymerized in a solvent. Also, polyurethane polymer [B] is preferably a polyurethane polymer polymerized in solution, that is, one in which polyurethane polymer [B] has been polymerized in a solvent. Most preferably, polyurethane polymer [A] and polyurethane polymer [B] are both polymerized in solution and mixed together without chipping or drying by desolvation. The melting points and crystallization points of polyurethane polymers [A] and [B] are controlled using a method common in the art. The main controlled factor is the ratio of diisocyanate to polymer diol, as a higher ratio of diisocyanate to polymer diol tends to increase the melting point and crystallization point.

[Thermal Properties of Polyurethane Elastic Yarn]

A polyurethane elastic yarn of the present invention has an exothermic peak (crystallization peak) as measured by a differential scanning calorimeter (DSC) in the range from 110° C. to 210° C., and a heat capacity at the exothermic peak of 3.0 J/g or more and 100 J/g or less. A heat generation peak in the range of 110° C. or higher and 210° C. or lower is derived from the heat generated when the hard segments of the polyurethane elastic yarn are aggregated to form crystals. Because the aggregation of hard segments in a polyurethane elastic yarn of the present invention is inhibited during spinning by polyurethane polymer [B], almost no hard segment crystals are produced by the time the spinning process has ended. In the DSC measurement, a sample is finely chopped up and pressed using a small metal pan to obtain a measurement sample, and the temperature is slowly raised at a rate of 3° C./min. When a polyurethane elastic yarn in which hard segment crystallization has been inhibited during spinning is measured using DSC, a large crystallization peak is observed due to the rise in temperature.

[Molecular Weight of Polyurethanes]

From the standpoint of imparting high durability and strength to the yarn, the molecular weight of the polyurethanes in the present invention is preferably in the range of 30,000 or more and 150,000 or less in terms of the number average molecular weight. In the present invention, the molecular weights are polystyrene-equivalent molecular weights as measured by GPC.

[Other Components]

A polyurethane elastic yarn of the present invention may contain stabilizers, pigments, etc. Examples of light stabilizers and antioxidants include hindered phenolic agents such as BHT and Sumilyzer (registered trademark) GA-80 from Sumitomo Chemical Co., Ltd., benzotriazole-based and benzophenone-based agents such as Tinuvin (registered trademark) from Ciba Geigy Co., Ltd., phosphorus-based agents such as Sumilyzer (registered trademark) P-16 from Sumitomo Chemical Co., Ltd., and hindered amine agents. Examples of pigments include inorganic substances such as iron oxide, titanium oxide, zinc oxide, cerium oxide, magnesium oxide, calcium carbonate and carbon black, as well as fluorine-based and silicone-based resin powders. Examples of lubricants include silicones and mineral oils. Examples of antistatic agents include cerium oxide, betaine and phosphoric acid. Any of these bound to a polymer are also preferred. In order to improve durability further with respect to light and nitrogen oxides, use of a nitrogen oxide supplement such as HN-150 from Nippon Hydrazine Co., Ltd., a thermal oxidation stabilizer such as Sumilyzer (registered trademark) GA-80 from Sumitomo Chemical Co., Ltd., and a light stabilizer such as Sumisorb (registered trademark) 300 #622 from Sumitomo Chemical Co., Ltd. is preferred.

[Production Method for Polyurethane Elastic Yarn]

The present invention is also a method for producing a polyurethane elastic yarn comprising polymerizing each of polyurethane polymer [A] and polyurethane polymer [B] below separately in solution, mixing together both polymerization solutions, and spinning the prepared spinning stock solution.

Polyurethane Polymer [A]:

a polyurethane polymer using as starting materials polymer diol A whose main chain repeating unit is an ether or an ester, diisocyanate A whose main skeleton is aromatic or aliphatic, and a single low molecular weight diol A having from 2 to 4 carbon atoms CA serving as a chain extender Polyurethane Polymer [B]:

a polyurethane polymer using as starting materials polymer diol A, diisocyanate A, and a single low molecular weight diol B having from 1 to 4 carbon atoms CB more than CA serving as a chain extender In the present invention, polyurethane polymer [B] is added to a spinning stock solution containing polyurethane polymer [A], and the solution is then spun. From the standpoint of stabilizing the polymerization process, polyurethane polymer [A] is preferably prepared in advance before adding polyurethane polymer [B]. The method used to produce polyurethane polymer [A], which is the solute in the solution, can be the melt polymerization method, the solution polymerization method, or some other method. However, the solution polymerization method is preferred. In the solution polymerization method, hardly any foreign substances such as gels are produced in the polyurethane polymer, making it easier to spin and making a polyurethane elastic yarn with low fineness easier to obtain. Solution polymerization is also advantageous because the solution preparation step can be eliminated.

A polyurethane polymer that is especially suitable for use in the present invention can be synthesized using PTMG with a molecular weight of 1,500 or more and 6,000 or less as the polymer diol, MDI as the diisocyanate, and ethylene glycol (EG), 1,3 propanediol and/or 1,4 butanediol as the chain extender.

[Solvent]

The polyurethane polymers are synthesized from the raw materials described above in a solvent such as dimethylacetamide (DMAc), N,N-dimethylformamide (DMF), dimethyl sulfoxide (DMSO), 1-methyl-2-pyrrolidone (NMP), etc. or a solvent containing these as main components. A preferred method is the so-called one-shot method in which the raw materials are added to the solvent and dissolved, and the resulting solution is heated to an appropriate temperature and reacted to form a polyurethane polymer. Another preferred method is a method in which a polymer diol and a diisocyanate are melt-reacted, and the reaction product is dissolved in a solvent and reacted with a chain extender to form a polyurethane polymer.

[Catalyst]

When synthesizing these polyurethane polymers, use of a catalyst such as an amine-based catalyst or an organometallic catalyst or use of two or more of these catalysts is preferred.

Examples of amine-based catalysts include N,N-dimethylcyclohexylamine, N,N-dimethylbenzylamine, triethylamine, N-methylmorpholine, N-ethylmorpholine, N,N,N',N'-tetramethylethylenediamine, N,N,N',N'-tetramethyl-1,3-propanediamine, N,N,N',N'-tetramethylhexanediamine, bis-2-dimethylaminoethyl ether, N,N,N',N',N'-pentamethyldiethylenetriamine, tetramethylguanidine, triethylenediamine, N,N'-dimethylpiperazine, N-methyl-N'-dimethylaminoethyl-piperazine, N-(2-dimethylaminoethyl) morpholine, 1-methylimidazole, 1,2-dimethylimidazole, N,N-dimethylaminoethanol, N,N,N'-trimethylaminoethylethanolamine, N-methyl-N'-(2-hydroxyethyl) piperazine, 2,4,6-tris (dimethylaminomethyl) phenol, N,N-dimethylaminohexanol, and triethanolamine.

Examples of organometallic catalysts include tin octanate, dibutyltin dilaurate, and lead dibutyl octanate.

The concentration of polyurethane polymer in the resulting polyurethane polymer solution is preferably in the range of 30% by mass or more and 80% by mass or less.

[Spinning Method]

A spinning stock solution obtained in the manner described above can be, for example, dry-spun, wet-spun or melt-spun to obtain a polyurethane elastic yarn of the present invention, which is then spooled. Dry spinning is preferred from the standpoint of stable spinning at all levels of fineness ranging from to thick to thin. There are no particular restrictions on the dry spinning method. The spinning may be performed after selecting the appropriate spinning equipment and spinning conditions for obtaining the desired properties.

Because the permanent deformation and stress relaxation properties of a polyurethane elastic yarn of the present invention are susceptible to the speed ratio between the Gode roller and the winder, the speed ratio is preferably determined based on the intended purpose for the yarn. From the standpoint of obtaining a polyurethane elastic yarn with the desired permanent deformation and stress relaxation properties, the speed ratio between the Gode roller and the winder is preferably in the range of 1.15 or more and 1.65 or less. Because the strength of a polyurethane elastic yarn can be improved by increasing the spinning speed, a spinning speed of 450 m/min or more is preferred in order to obtain a practical level of strength. From the standpoint of industrial production, a spinning speed of about 450 to 1,000 m/min is preferred.

Because the fiber structure of the present invention in a polyurethane elastic yarn described above or a polyurethane elastic yarn obtained using the manufacturing method described above has excellent processability, including elasticity and heat setting properties, a thin fabric with sufficient elasticity and aesthetic appeal can be obtained, and high-quality garments that look good can be obtained. These features are especially noteworthy in knitted fabrics. A circular knitted fabric with the fiber structure of the present invention in a polyurethane elastic yarn described above or a polyurethane elastic yarn obtained using the manufacturing method described above can be used in clothing pursuing a certain aesthetic look through body hugging properties, such as underwear, stockings, and tights.

There are no particular restrictions on the fineness, number of single yarns, and cross-sectional profile, of polyurethane elastic yarns of the present invention. For example, it may be a monofilament composed of one single yarn or a multifilament composed of a plurality of single yarns. The cross-sectional profile of the thread may be circular or flat.

EXAMPLES

The present invention will now be described in greater detail using examples, but the present invention is not limited to these examples. Unless otherwise stated, the number n of evaluations was n=3.

[Strength, Stress Relaxation, Permanent Deformation, and Elongation of Polyurethane Elastic Yarn]

The strength, stress relaxation, permanent deformation, and elongation of the polyurethane elastic yarns were measured by performing a tensile test on sample yarn using an Instron 4502-type tensile tester.

These properties are defined in the following way. A 5 cm (L1) sample was stretched by 300% five times at a tensile rate of 50 cm/min. The stress after the fifth time was used as (G1). Next, the 300% elongation was held for 30 seconds. The stress after holding for 30 seconds was used as (G2).

Next, the length of the sample yarn after elongation recovery when the stress returned to 0 was used as (L2). The sample yarn was stretched a sixth time until it broke. The stress at the time of breaking was used as (G3), and the length of the sample yarn at the time of breaking was used as (L3). The tensile test was performed five times and the average values were used in the evaluation.

The properties were calculated using the following equations.

$$\text{Strength}=(G3)$$

$$\text{Stress Relaxation}=100\times((G1)-(G2))/(G1)$$

$$\text{Permanent Deformation}=100\times((L2)-(L1))/(L1)$$

$$\text{Elongation}=100\times((L3)-(L1))/(L1)$$

[Heat Setting Properties]

A sample yarn (length=L5) was 100% elongated (length=2×(L5)). The yarn was treated at a predetermined temperature for one minute at this length. The yarn was then allowed to stand in a stretched state at room temperature for one day. Next, the stretched state of the sample yarn was then released, and the sample yarn was allowed to stand at room temperature for one day. The length (L6) was then measured. The heat setting properties are defined by the following equation. A higher value indicates better heat setting properties.

$$\text{Heat Setting Properties}=100\times((L6)-(L5))/(L5)$$

[Exothermic Peak Temperature, Heat Value]

These measurements were performed using a differential scanning calorimeter (2920MDSC from TA Instruments Japan Co., Ltd.) connected to TA5000 from TA Instruments Japan Co., Ltd. Approximately 8 mg of the cut sample yarn was collected in an aluminum pan, covered, and crimped to prepare a sample. After setting the sample and a reference sample in predetermined positions inside a cell, measurements were taken under a nitrogen stream with a flow rate of 40 Nml/min. The temperature was raised from room temperature to 50° C. at a rate of increase (scanning speed) of 3° C./min, held for five minutes, and then raised to 300° C. The exothermic peak temperature and heat capacity derived from the crystallization of the sample yarn recorded at this time were measured and used as the exothermic peak temperature (unit: ° C.) and heat capacity (unit: J/g) values.

[Thermal Adhesion]

Two test yarns 1 sampled at a length of 10 cm (with both ends tied and fixed) were intertwined around the center as shown in FIG. 1 and fixed to a metal frame 2 at an interval of 1 cm (a). Each test yarn 1 was stretched by 30%, and then treated at a predetermined dry heat temperature for one minute (b). After the treatment, the samples were removed from the metal frame 2 so that the two test yarns remained in contact with each other only in the bonded portions 3 (c). In an Instron 4502-type tensile tester, one end of each test yarn was placed in the upper and lower chucks of the tester and set. The maximum tensile stress when the bonded portions were peeled apart at a rate of 50 cm/min was measured, and the measured value was divided by the fineness of the polyurethane elastic fiber sample.

Example 1

A DMAC solution (35% by weight) of polyurethane polymer A1 consisting of PTMG with a molecular weight of 2,000 (PTMG2000 in the table; same below), MDI, ethylene glycol (EG) and 1-butanol terminal blocker was prepared for polyurethane polymer [A]. Next, a polyurethane solution produced by reacting t-butyldiethanolamine with methylene-bis-(4-cyclohexyl isocyanate) (DuPont Metachlor (registered trademark) 2462D) and a condensation polymer of p-cresol and divinylbenzene (DuPont Metachlor (registered trademark) 2390D) were mixed together at a ratio (mass ratio) of 2:1 to prepare an antioxidant DMAc solution (concentration 35% by mass). Then, 96 parts by mass of the DMAc solution of the polyurethane polymer and 4 parts by mass of the antioxidant solution were mixed together to prepare polymer solution pu1.

Next, thermoplastic polyurethane Pandex (registered trademark) T-8175N (polyurethane polymer B1) from DIC Covestro Co., Ltd. was dissolved in DMAc to obtain a 35 mass % polymer solution tp1 to serve as polyurethane polymer [B].

Polymer solution pu1 and polymer solution tp1 were uniformly mixed together at 96.5% by mass and 3.5% by mass, respectively, to prepare spinning solution P1. This was dry-spun at a speed of 720 m/min with a speed ratio of 1.3 between the Gode roller and the winder to obtain 200 g of spooled 20-decitex/single-filament polyurethane elastic yarn PU113 containing 3.0% by mass of polyurethane polymer B1.

The heat capacity at the exothermic peak, the strength, the stress relaxation, the permanent deformation, the elongation, the heat setting properties, and the thermal adhesion of the resulting polyurethane elastic yarn were measured. The composition and results are shown in Table 1.

Example 2

Polymer solution pu1 and polymer solution tp1 were uniformly mixed together at 93.0% by mass and 7.0% by mass, respectively, to prepare spinning solution P2. This was dry-spun at a speed of 720 m/min with a speed ratio of 1.3 between the Gode roller and the winder to obtain 200 g of spooled 20-decitex/single-filament polyurethane elastic yarn PU116 containing 6.0% by mass of polyurethane polymer B1. The heat capacity at the exothermic peak, the strength, the stress relaxation, the permanent deformation, the elongation, the heat setting properties, and the thermal adhesion of the resulting polyurethane elastic yarn were measured. The composition and results are shown in Table 1.

Example 3

A DMAC solution tp2 (25% by weight) of polyurethane polymer B2 was prepared for polyurethane polymer [B] in which PTMG with a molecular weight of 2,000, MDI, ethylene glycol and 1-butanol terminal blocker had been polymerized in a DMAc solution.

Polymer solution pu1 and polymer solution tp2 were uniformly mixed together at 92.0% by mass and 8.0% by mass, respectively, to prepare spinning solution P3. This was dry-spun in the same manner as in Example 1 to obtain 200 g of spooled 20-decitex/single-filament polyurethane elastic yarn PU126 containing 6.0% by mass of polyurethane polymer B2. The composition and results are shown in Table 1.

Example 4

A DMAC solution tp2a (35% by weight) of polyurethane polymer B2 was prepared for polyurethane polymer [B] in which PTMG with a molecular weight of 2,000, MDI, ethylene glycol and 1-butanol terminal blocker had been polymerized in a DMAc solution.

Polymer solution pu1 and polymer solution tp2a were uniformly mixed together at 6.0% by mass and 94.0% by mass, respectively, to prepare spinning solution P4. This was dry-spun in the same manner as in Example 1 to obtain 200 g of spooled 20-decitex/single-filament polyurethane elastic yarn PU226 containing 94.0% by mass of polyurethane polymer B2. The composition and results are shown in Table 1.

Example 5

A DMAC solution tp3 (35% by weight) of polyurethane polymer B3 was prepared for polyurethane polymer [B] in which PTMG with a molecular weight of 2,000, MDI, 1,6-hexanediol and 1-butanol terminal blocker had been polymerized in a DMAc solution.

Polymer solution pu1 and polymer solution tp3 were uniformly mixed together at 94.0% by mass and 6.0% by mass, respectively, to prepare spinning solution P5. This was dry-spun in the same manner as in Example 1 to obtain 200 g of spooled 20-decitex/single-filament polyurethane elastic yarn PU326 containing 6.0% by mass of polyurethane polymer B2. The composition and results are shown in Table 1.

Example 6

DMAC solution tp2a of polyurethane polymer B2 (35% by mass) was used as polyurethane polymer [A], and DMAC solution tp3 of polyurethane polymer B3 (35% by mass) was used as polyurethane polymer [B]. Polymer solution tp2a and polymer solution tp3 were uniformly mixed together at 94.0% by mass and 6.0% by mass, respectively, to prepare spinning solution P6. This was dry-spun in the same manner as in Example 1 to obtain 200 g of spooled 20-decitex/single-filament polyurethane elastic yarn PU426 containing 6.0% by mass of polyurethane polymer B2. The composition and results are shown in Table 1.

Comparative Example 1

Polymer solution pu1 was dry-spun in the same manner as in Example 1 to obtain 200 g of spooled 20-decitex/single-filament polyurethane elastic yarn PU100. The composition and evaluation results are shown in Table 1.

Comparative Example 2

Polymer solution tp2a was dry-spun in the same manner as in Example 1 to obtain 200 g of spooled 20-decitex/single-filament polyurethane elastic yarn PU100. The composition and evaluation results are shown in Table 1.

Comparative Example 3

A DMAC solution (35% by weight) of a polyurethane urea polymer consisting of PTMG with a molecular weight of 1,800, MDI, ethylenediamine, and a diethylamine terminal sequestering agent was prepared. Next, a polyurethane solution produced by reacting t-butyldiethanolamine with methylene-bis-(4-cyclohexyl isocyanate) (DuPont Metachlor (registered trademark) 2462D) and a condensation polymer of p-cresol and divinylbenzene (DuPont Metachlor (registered trademark) 2390D) were mixed together at a ratio (mass ratio) of 2:1 to prepare an antioxidant DMAc solution (concentration 35% by mass). Then, 96 parts by mass of the DMAc solution of the polyurethane polymer and 4 parts by mass of the antioxidant solution were mixed together to prepare polymer solution pu3.

Polymer solution pu3 was dry-spun in the same manner as in Example 1 to obtain 200 g of spooled 20-decitex/single-filament polyurethane elastic yarn PU500. The composition and evaluation results are shown in Table 1.

Comparative Example 4

Pandex (registered trademark) T-8180 thermoplastic polyurethane from DIC Covestro was dissolved in DMAc to obtain 30% by mass polymer solution tp3.

Next, polymer solution pu2 and polymer solution tp3 were uniformly mixed together at 93.0% by mass and 7.0% by mass to obtain spinning solution PX4.

This spinning solution was dry-spun in the same manner as in Example 1 to obtain 200 g of spooled 20-decitex/single-filament polyurethane elastic yarn PU536 containing 6.0% by mass of polyurethane polymer B3. The composition and evaluation results are shown in Table 1.

Comparative Example 5

A DMAc solution (30% by weight) of a thermoplastic polyurethane elastomer from Nippon Miractran (E790PNAT, adipate-based) (polyurethane polymer B4) was adjusted by stirring at 60° C. to obtain polymer solution tp4.

Polymer solution pu1 and polymer solution tp4 were uniformly mixed together at 93.0% by mass and 7.0% by mass to obtain spinning solution PX5. This spinning solution was dry-spun in the same manner as in Example 1 to obtain 200 g of spooled 20-decitex/single-filament polyurethane elastic yarn PU146 containing 6.0% by mass of polyurethane polymer B4. The composition and evaluation results are shown in Table 1.

Comparative Example 6

Polymer solution pu2 and polymer solution tp4 were uniformly mixed together at 93.0% by mass and 7.0% by mass to obtain spinning solution PX6. This spinning solution was dry-spun in the same manner as in Example 1 to obtain 200 g of spooled 20-decitex/single-filament polyurethane elastic yarn PU546 containing 6.0% by mass of polyurethane polymer B4. The composition and evaluation results are shown in Table 1.

TABLE 1

| | Polyurethane Fiber Abbreviation | Polyurethane Polymer [A] Name — | Polyurethane Polymer [A] Diisocyanate Name | Polyurethane Polymer [A] Polymer Diol Name | Polyurethane Polymer [A] Chain Extender Name | Polyurethane Polymer [A] Solvent Boiling Point ° C. | Polyurethane Polymer [B] Name — |
|---|---|---|---|---|---|---|---|
| Example 1 | PU113 | A1 | MDI | PTMG2000 | EG | 165 | B1 |
| Example 2 | PU116 | A1 | MDI | PTMG2000 | EG | 165 | B1 |
| Example 3 | PU126 | A1 | MDI | PTMG2000 | EG | 165 | B2 |
| Example 4 | PU226 | A1 | MDI | PTMG2000 | EG | 165 | B2 |
| Example 5 | PU326 | A1 | MDI | PTMG2000 | EG | 165 | B3 |
| Example 6 | PU426 | A2 | MDI | PTMG2000 | BG | 165 | B3 |
| Comparative Example 1 | PU100 | A1 | MDI | PTMG2000 | EG | 165 | — |
| Comparative Example 2 | PU200 | A2 | MDI | PTMG2000 | BDO | 165 | — |
| Comparative Example 3 | PU500 | A5 | MDI | PTMG1800 | EDA | 165 | — |
| Comparative Example 4 | PU136 | A1 | MDI | PTMG2000 | EG | 165 | B3 |
| Comparative Example 5 | PU146 | A1 | MDI | PTMG2000 | EG | 165 | B4 |
| Comparative Example 6 | PU546 | A5 | MDI | PTMG1800 | EDA | 165 | B4 |

| | Polyurethane Polymer [B] Diisocyanate Name | Polyurethane Polymer [B] Polymer Diol Name | Polyurethane Polymer [B] Chain Extender Name | Polyurethane Polymer [B] Crystallization Point ° C. | Polyurethane Polymer [B] Amount mass % | DSC Amt. of Heat Required from Exothermic Peak Temp. in Range from 150-210° C. J/g |
|---|---|---|---|---|---|---|
| Example 1 | MDI | PTMG2000 | BG | 155 | 3.0 | 7.2 |
| Example 2 | MDI | PTMG2000 | BG | 155 | 6.0 | 14.0 |
| Example 3 | MDI | PTMG2000 | BG | 153 | 6.0 | 22.5 |
| Example 4 | MDI | PTMG2000 | BG | 153 | 94.0 | 18.0 |
| Example 5 | MDI | PTMG2000 | HDO | 105 | 6.0 | 20.5 |
| Example 6 | MDI | PTMG2000 | HDO | 105 | 6.0 | 8.8 |
| Comparative Example 1 | — | — | — | — | 0.0 | 1.5 |
| Comparative Example 2 | — | — | — | — | 0.0 | 1.3 |
| Comparative Example 3 | — | — | — | — | 0.0 | Undetected |
| Comparative Example 4 | MDI | PTMG2000 | BG | 190 | 6.0 | 0.6 |
| Comparative Example 5 | HDI | Adipate | BG | 140 | 6.0 | Undetected |
| Comparative Example 6 | HDI | Adipate | BG | 140 | 6.0 | Undetected |

| | Spinnability Thread Breaks breaks/10 h | Tensile Properties Elongation % | Tensile Properties Strength CN | Tensile Properties Permanent Deformation % | Stress Relaxation % | Heat Setting 160° C. % | Heat Setting 180° C. % | Thermal Adhesion 160° C. cN/dtex | Thermal Adhesion 180° C. cN/dtex | Thermal Adhesion Evaluation — |
|---|---|---|---|---|---|---|---|---|---|---|
| Example 1 | ○ | 420 | 24 | 26 | 35 | 75 | 88 | 0.28 | 0.35 | — |
| Example 2 | ○ | 430 | 25 | 27 | 35 | 80 | 95 | 0.32 | 0.38 | ◎ |
| Example 3 | ○ | 455 | 27 | 23 | 33 | 90 | 100 | 0.40 | 0.42 | ◎ |
| Example 4 | ○ | 480 | 27 | 30 | 36 | 99 | 100 | 0.46 | 0.35 | ◎ |
| Example 5 | ○ | 430 | 25 | 23 | 33 | 80 | 95 | 0.42 | 0.40 | ◎ |
| Example 6 | ○ | 520 | 25 | 30 | 36 | 100 | 100 | 0.40 | 0.31 | ◎ |
| Comparative Example 1 | ○ | 415 | 24 | 27 | 35 | 57 | 80 | 0.05 | 0.11 | X |
| Comparative Example 2 | ○ | 440 | 23 | 29 | 36 | 95 | 100 | 0.12 | 0.18 | X |
| Comparative Example 3 | ○ | 450 | 23 | 22 | 31 | 40 | 51 | 0.04 | 0.05 | X |
| Comparative Example 4 | ○ | 400 | 23 | 30 | 38 | 62 | 82 | 0.10 | 0.23 | Δ |

TABLE 1-continued

| | | | | | | | | | | |
|---|---|---|---|---|---|---|---|---|---|---|
| Comparative Example 5 | ○ | 405 | 20 | 29 | 35 | 59 | 81 | 0.17 | 0.36 | Δ |
| Comparative Example 6 | ○ | 440 | 22 | 30 | 38 | 46 | 58 | 0.14 | 0.31 | Δ |

BRIEF DESCRIPTION OF THE DRAWINGS

FIG. 1 is a schematic diagram showing the method used to measure the thermal adhesion of the polyurethane elastic yarns.

The invention claimed is:

1. A polyurethane elastic yarn comprising polyurethane polymer [A] and polyurethane polymer [B] below, wherein the ratio of polyurethane polymer [A] to polyurethane polymer [B] in terms of parts by mass is from 1:99 to 30:70 or from 70:30 to 99:1, the exothermic peak (crystallization peak) of the polyurethane elastic yarn as measured by a differential scanning calorimeter (DSC) is in the range from 110° C. to 210° C., and the heat capacity at the exothermic peak is 3.0 J/g or more and 100 J/g or less, wherein Polyurethane polymer [A]:

a polyurethane polymer using as starting materials polymer diol A whose main chain repeating unit is an ether or an ester, diisocyanate A whose main skeleton is aromatic or aliphatic, and a single low molecular weight diol A having from 2 to 4 carbon atoms CA serving as a chain extender; and Polyurethane polymer [B]:

a polyurethane polymer using as starting materials polymer diol A, diisocyanate A, and a single low molecular weight diol B having from 1 to 4 carbon atoms CB more than CA serving as a chain extender.

2. A polyurethane elastic yarn according to claim 1, wherein the melting point MpA of polyurethane polymer [A] as measured by a differential scanning calorimeter (DSC) is from 130 to 260° C., and the melting point MpB of polyurethane polymer [B] as measured by a differential scanning calorimeter (DSC) is 10 to 100° C. lower than melting point MpA.

3. A polyurethane elastic yarn according to claim 1, wherein polyurethane polymer [A] is a polyurethane polymer polymerized in solution.

4. A polyurethane elastic yarn according to claim 1, wherein the polymer diol in polyurethane polymer [A] is poly (tetramethylene ether) glycol (PTMG).

5. A method for producing a polyurethane elastic yarn comprising polymerizing each of polyurethane polymer [A] and polyurethane polymer [B] below separately in solution, mixing together both polymerization solutions, and spinning the prepared spinning stock solution, wherein the exothermic peak (crystallization peak) of the polyurethane elastic yarn as measured by a differential scanning calorimeter (DSC) is in the range from 110° C. to 210° C.; and wherein Polyurethane polymer [A]:

a polyurethane polymer using as starting materials polymer diol A whose main chain repeating unit is an ether or an ester, diisocyanate A whose main skeleton is aromatic or aliphatic, and a single low molecular weight diol A having from 2 to 4 carbon atoms CA serving as a chain extender; and Polyurethane polymer [B]:

a polyurethane polymer using as starting materials polymer diol A, diisocyanate A, and a single low molecular weight diol B having from 1 to 4 carbon atoms CB more than CA serving as a chain extender.

* * * * *